United States Patent [19]
Marchetto et al.

[11] Patent Number: 5,666,378
[45] Date of Patent: Sep. 9, 1997

[54] HIGH PERFORMANCE MODEM USING PILOT SYMBOLS FOR EQUALIZATION AND FRAME SYNCHRONIZATION

[75] Inventors: Robert F. Marchetto, Burnaby; Todd A. Stewart, West Vancouver; Glenn S. Fawcett, Vancouver, all of Canada

[73] Assignee: Glenayre Electronics, Inc., Charlotte, N.C.

[21] Appl. No.: 215,129

[22] Filed: Mar. 18, 1994

[51] Int. Cl.$^6$ .................................................. H04B 1/38
[52] U.S. Cl. ...................... 375/222; 375/231; 375/235; 375/340
[58] Field of Search ................................. 375/222, 344, 375/324, 335, 340, 341, 347, 349, 360, 354, 261, 266, 275, 231, 235, 234; 370/110.1; 455/45; H04B 1/38

[56] References Cited

U.S. PATENT DOCUMENTS

| | | | |
|---|---|---|---|
| 4,608,703 | 8/1986 | Kaga et al. | 375/114 |
| 5,140,615 | 8/1992 | Jasper et al. | 375/347 |
| 5,241,544 | 8/1993 | Jasper et al. | 370/105.3 |
| 5,351,274 | 9/1994 | Chennakeshu et al. | 375/347 |
| 5,369,682 | 11/1994 | Witsaman | 379/57 |
| 5,396,656 | 3/1995 | Jasper et al. | 375/349 |
| 5,414,734 | 5/1995 | Marchetto | 375/267 |
| 5,513,215 | 4/1996 | Marchetto | 375/233 |

*Primary Examiner*—Edward L. Coles, Sr.
*Assistant Examiner*—Madeleine Au Nguyen
*Attorney, Agent, or Firm*—Christensen O'Connor Johnson & Kindness PLLC

[57] ABSTRACT

A modulator that modulates and encodes data using data symbols, interspersed with pilot symbols, for transmission to another modem, and a demodulator that decodes data symbols of a signal received from another modem. In the demodulator, a received signal is sampled at four times the symbol rate. The sampled signal is converted to quadrature signals and low-pass filtered to produce a complex baseband signal. Data symbols in the complex baseband signal are sampled in synchronization with the start of each symbol based on the pilot symbols that are interspersed in the signal. By processing the pilot symbols, full modem synchronization is maintained down to a very low signal-to-noise ratio, through noise bursts, or even when the data symbols representing data are replaced by predefined sequences of data symbols that convey the dots and dashes of Morse code identifying the station transmitting the modulated signal. The continued presence of pilot symbols interspersed with the sequences of data symbols conveying Morse code prevents loss of synchronization between the transmitting station and the receiving station. The pilot symbols are also used to update equalizer tap coefficients in an equalizer of the demodulator, thereby minimizing errors in the output data caused by channel fading, noise, and other effects. In addition, the sequence of pilot symbols is used to delimit data frames, so that bit synchronization and frame synchronization in the data are not required.

6 Claims, 11 Drawing Sheets

HIGH PERFORMANCE MODEM USING PILOT SYMBOLS FOR EQUALIZATION AND FRAME SYNCHRONIZATION

FIELD OF THE INVENTION

This invention generally relates to modulating and demodulating data for transmission between two locations, and more specifically, to synchronizing frames of data that are modulated at one location and transmitted to another, where the frames of data are demodulated.

BACKGROUND OF THE INVENTION

The term "modem" is a concatenation of portions of two words, "modulator" and "demodulator," and is applied to devices that are capable of modulating data for transmission over a telephone or radio frequency (RE) link and demodulating data received from another location that was modulated by a similar device. The use of modems for interconnecting personal computers so that users can exchange data and communicate has become widespread. Improvements in technology have reduced the cost of modems currently available while increasing the rates at which data can be transmitted.

In achieving each successive level of improvement in data rate, modem manufacturers have tended to adopt and conform to industry-wide standards that define the operation of the modem, thereby ensuring at least some degree of compatibility between modems. For example, the Comité Consultatif Internationale de Tél égraphie et Téléphonie (CCITT) V.32 Standard defines a type of modem with one of the fastest available data rates, 9600 bits/sec. (ignoring standards such as CCITT V.42 bis that employ data compression to achieve higher effective data rates, and proprietary systems). The next higher data transfer standard will be provided with the release of the V-fast Standard, with speeds beyond 14.4 Kbits/sec. The use of modems is not limited to data exchange between computers, and in certain applications, proprietary modem modulation protocol designs can provide improved performance.

In paging systems, modems are often used to transmit data between a central paging terminal and a plurality of simulcast paging transmitters for retransmission as a radio signal to a pager unit carded by a subscriber of the paging service. The data received by the paging unit can then be read by the subscriber on a display screen that is part of the paging unit. An asynchronous modem suitable for use in a simulcast paging system is disclosed in commonly assigned U.S. Pat. No. 5,227,741, entitled "Variable Speed Asynchronous Modem." Although the modem disclosed in the patent successfully deals with problems of isochronous distortion (system "jitter") to achieve data transfer rates over radio frequency links in excess of 2400 bits/sec., it can not achieve the 9600 bits/sec. performance of the V.32 Standard that is more typically used in connection with telephone line modems.

There are several problems that are encountered in the application of a modem to simulcast paging systems that typically do not arise in telephone line modem applications and are not very well addressed by the V.32 Standard. Telephone line signal-to-noise ratio (SNR), particularly on some unconditioned lines, can cause errors to arise in the data transmitted between two V.32 modems. In response to a SNR of about 24 dB, the V.32 Standard calls for the modems that are linked to drop to a lower data rate, possibly 4800 bits/sec. or even 2400 bits/see. As a result, the actual or real data rate of a modem conforming to the V.32 Standard in a simulcast link network is much less than 9600 bits/sec., especially after applying forward error correction techniques. It would be preferable to maintain the higher 9600 bits/sec. rate, even at the lower SNR. Furthermore, it would be desirable to improve data throughput by having low overhead forward error correction and control information.

When two V.32 modems establish a link, there is an initial period of training and synchronization, which may require repeating if interrupted by a brief line outage or noise burst. At the receiving modem, the process of synchronization requires identifying the timing of each symbol in the data to accurately determine when each symbol occurs. Once synchronization at the symbol level is achieved, the receiving modem must find the start and end of each data frame from the demodulated data stream. Further, the synchronization of a V.32 modem requires a return path or alarm return in order to request the retransmission of trig sequences any time that synchronization is lost, thereby significantly reducing data throughput. It would be preferable to provide automatic synchronization for two modems establishing a communication link and to provide for automatic recovery from brief line outages and noise bursts, without using a return path.

In addition, the V.32 Standard is very sensitive to low SNR. For example, demodulator synchronization in a modem conforming to the V.32 Standard is typically lost at a SNR range of about 22 to 24 dB. Ideally, synchronization should be maintained to a SNR less than about 10 dB in a paging link system, to provide adequate system performance.

Another significant limitation of the V.32 standard for use in an RF linked communications system is the Federal Communications Commission (FCC) requirement of periodic identification of data link transmitters using discernible Morse code. Under the V.32 Standard, sending a station identifier in Morse code causes the demodulator to completely lose synchronization. Therefore, after the Morse code is sent, the two modems previously communicating must again engage in the training and synchronization sequence that extends over about one second. In a busy paging system, loss of data throughput during this retraining and synchronization interval can significantly limit the system. The V.32 Standard provides for equalizing amplitude and group delay distortion, but the equalizers typically used for this purpose introduce about 2 dB degradation in the modem performance, which represents an undesirable modem degradation. Equalizer performance of modems used for simulcast paging, particularly in links having a poor SNR, should be improved over the current state, to at least meet, if not exceed, the V.32 Standard, and to be able to withstand substantial impulse noise.

The present invention addresses the above-noted problems in the V.32 Standard and in other prior art modems not discussed above. Although it was developed to meet the needs of a specific simulcast paging system, this invention has applicability to almost any communications system in which data must be efficiently transferred via modem between two geographically disparate points at relatively high rates.

SUMMARY OF THE INVENTION

In accordance with the present invention, apparatus for demodulating an input signal are defined. The analog input signal specifically includes both data symbols that are used to encode data and pilot symbols (also known as reference symbols). The apparatus comprises sample means that are coupled to receive the input signal and periodically sample it to produce a corresponding digital sample signal. Quadrature conversion means convert the digital sample signal into a complex baseband signal. The complex baseband signal is then processed by symbol synchronization means to determine symbol timing for the data symbols in the complex baseband signal, as a function of the pilot symbols and data symbols that are also contained within it, producing a synchronized signal in which the data symbols are properly aligned in synchronization with their symbol times. Also provided are means for separating the pilot symbols from the data symbols in the synchronized signal, producing a data symbol signal. Decoding means decode the data symbol signal to recover data corresponding to the data symbols that are contained therein.

The pilot symbols comprise a repeating pattern of a pre-defined number of pilot symbols interspersed at predefined intervals with the data symbols. The symbol synchronization means comprise means for determining differential phase relationships for successive pilot symbols in the complex baseband signal where a 180° phase shift represents a decoded pilot symbol equal to a binary "1" and a 0° phase shift represents a decoded pilot symbol equal to a binary "0." This sequence of decoded pilot symbols is then compared with the expected sequence of pilot symbols to determine the start of the pilot symbol sequence. Equalizer means, coupled to receive the synchronized signal and the equalizer coefficients, equalize the synchronized signal as a function of the equalizer coefficients to compensate for any degradation of the input signal that would inhibit decoding the data symbols to recover the data. Preferably, the decoding means comprise a trellis decoder.

The symbol synchronization means also preferably include means for sampling the complex baseband signal at times that synchronize the data symbols with their corresponding symbol times.

One of the features of the present invention is that the symbol synchronization means include means for maintaining complete modem synchronization if Morse code replaces the data symbols in the input signal. This feature prevents loss of synchronization if Morse code that identifies a source of the input signal is periodically input to the sample means. Modem synchronization includes: (a) symbol timing synchronization, (b) pilot symbol synchronization, (c) phase and frequency tracking synchronization, (d)forward error correction flaming synchronization, and (e) equalizer convergence.

A method for demodulating an input signal that includes data symbols used to encode data and pilot symbols is another aspect of the present invention. The steps of this method are generally consistent with the functions of the elements comprising the apparatus discussed above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
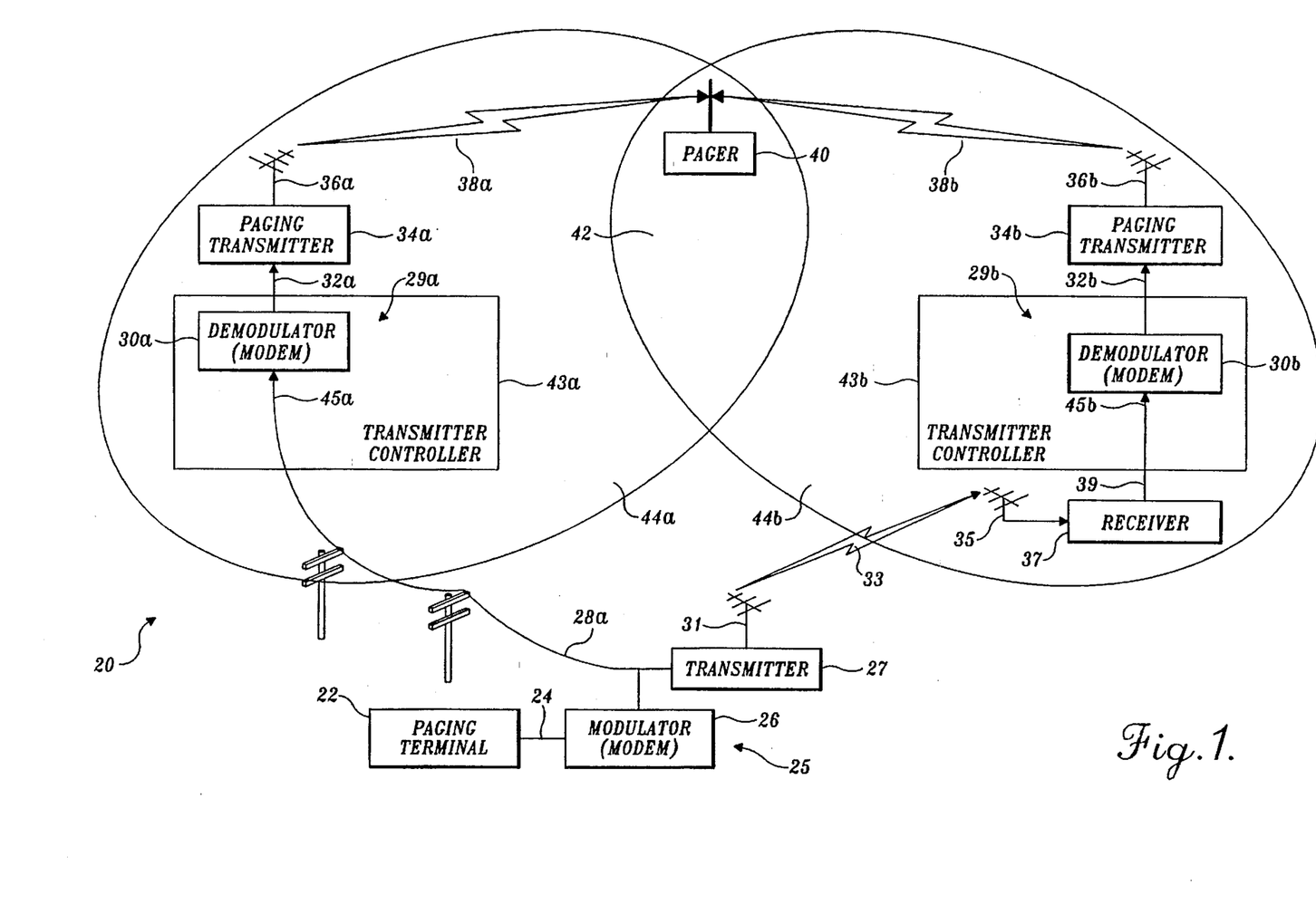
FIG. 1 is a schematic block diagram illustrating a simulcast paging system in which the present invention is used.

A simulcast paging system 20 in which the present invention is used for demodulating data is shown in FIG. 1. Simulcast paging system 20 includes a paging terminal 22, which is a source of data messages that are transmitted to specific pager units carded by customers subscribing to the simulcast paging system. Such data messages are typically generated by other equipment (not shown) that is connected to paging terminal 22, as will be apparent to those of ordinary skill in the art. Associated with paging terminal 22 and connected to it by a data line 24 is a modem 25. In simulcast paging system 20, paging terminal 22 most often transmits modulated data messages to a plurality of paging transmitters 34 rather than receiving such messages, and the modulator portion of modem 25 receives much more use than the demodulator portion. Therefore, while both the modulator and demodulator functions of the modem are available to paging terminal 22, modem 25 is hereafter referred to simply as modulator 26.

The data messages input to modulator 26 from paging terminal 22 are typically in the form of non-return-to-zero (NRZ) data; however, other data formats can also be modulated by modulator 26, including digital data in the form of compressed voice communications. As explained below, modulator 26 produces a modulated signal that conveys the data supplied from paging terminal 22 to each of the plurality of paging transmitters 34. In FIG. 1, only two such paging transmitters 34a and 34b are shown for purposes of illustration, but it will be understood that simulcast paging system 20 typically includes many more such paging transmitters, some of which may be connected to paging terminal 22 by an RF link 33, as is paging transmitter 34b, instead of by telephone lines 28, as is paging transmitter 34a.

The modulated signal produced by modulator 26 is conveyed over telephone lines 28 and transmitted by a transmitter 27 from an antenna 31 to corresponding modems 29a and 29b, respectively. In the case of paging transmitter 34b, an antenna 35 receives the modulated signal and supplies it to a receiver 37. Transmitter controllers 43 located at each paging transmitter site include modem 29 and other components that are not shown. The modulated signal conveyed by telephone lines 28 is input to modem 29a on a line 45a. Similarly, a received modulated signal output from receiver 37 is coupled by a line 39 to transmitter controller 43b, and the modulated signal is input over a line 45b to modem 29b.

The paging transmitters primarily use the demodulator portion 30 of modems 29 for demodulating data messages transmitted from paging terminal 22 and have only an occasional need of the modulator portion of the modem. Accordingly, modems 29a and 29b are hereafter referred to simply as demodulators 30a and 30b. Nevertheless, the modulator capability of the modems installed at the paging transmitters is available to paging transmitters 34a and 34b when needed and is periodically used by them for transmission of system-related data messages back to paging terminal 22, for example, in responding if the paging transmitter is poled by the paging terminal. Demodulators 30 process the modulated signal transmitted via telephone lines 28 and RF link 33 from paging terminal 22, demodulating the signal to produce the data message conveyed thereby, which is input to their corresponding paging transmitter 34. Paging transmitters 34a and 34b each modulate an RF carrier at the same frequency, transmitting the data message through antennas 36a and 36b, respectively, as radio signals 38a and 38b. The radio transmissions are received by, for example, a pager unit 40, which is carded by a subscriber to the paging service who is the intended recipient. The pager may be disposed within a reception zone 44a of paging transmitter 34a, or in a reception zone 44b of paging transmitter 34b, or in both reception zones.

It should be noted at this point that the present invention is not in any way limited to use in a paging system, but has simply been disclosed in connection with such a system, since that is one of the first contemplated commercial uses of the modem. Modulator 26 and demodulator 30 could also equally well be used to transfer data between two personal computers (not shown), e.g., interconnected via telephone line 28.

Figure 2:
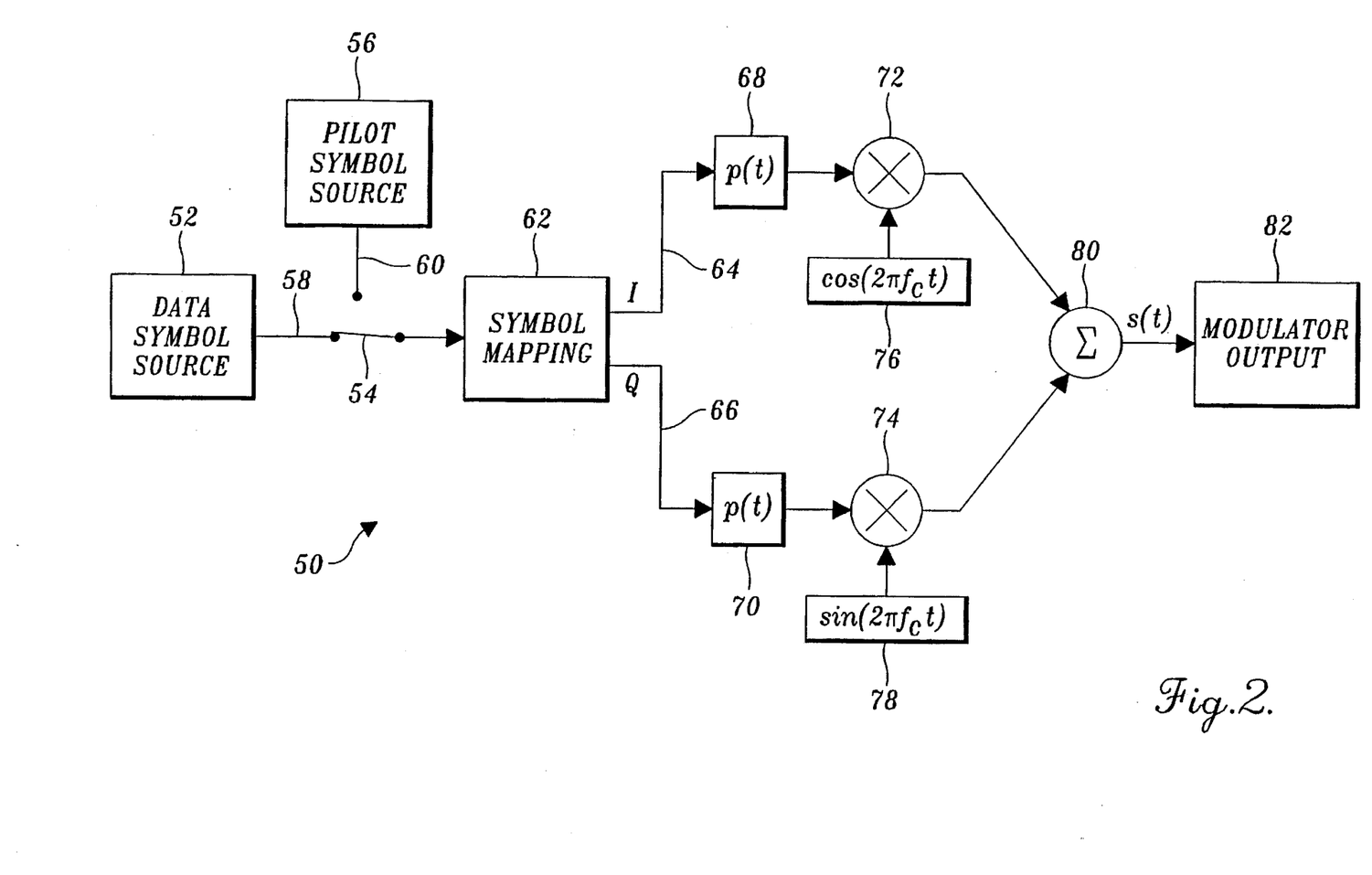
FIG. 2 is a functional block diagram of a modulator that maps input data to data symbols periodically interspersed with pilot symbols.

Turning now to FIG. 2, a functional block diagram 50 illustrates how modulator 26 processes input data for transmission to and demodulation by demodulator 30, in accordance with the present invention. The modulator produces a series of data symbols corresponding to the input data, as shown in a block 52. In the preferred embodiment, the data symbols are produced by trellis encoding an input signal using a 16-state trellis coded modulation (TCM) scheme, which employs a 32-cross constellation set. This TCM scheme provides a gain of 4.77 dB over conventional unencoded 16-level quadrature amplitude modulated (QAM) signals. The V.32TCM specification of the prior art employs a 90° phase invariant, eight state TCM scheme, with 3.98 dB of gain compared to unencoded 16-QAM. Moreover, unlike prior art standards such as the V.32, the present invention provides for periodically inserting pilot symbols into the stream of data symbols.

As shown in block 56 of FIG. 2, the pilot symbols are produced by a pilot symbol source, which generates a predefined pseudo-random sequence of the pilot symbols (or preferably, accesses a look-up table in which a predetermined randomly generated sequence of pilot symbols is stored). In the preferred embodiment, there are 63 pilot symbols in the repeating pseudo-random sequence. This pseudo-random sequence should have a sufficient number of pilot symbols so that an auto-correlation function of the sequence has a well defined peak, i.e., a ratio of a maximum peak to that of the false peaks (background) should be at least two-to-one in the auto-correlation function. In addition, the particular sequence should have a frequency domain spectrum that simulates random white noise; this characteristic permits data symbols conveying Morse code transmissions to be discernible above any audible "noise" of the pilot symbols, while maintaining the pilot symbols in the modulated data stream for synchronization purposes. Pilot symbols comprising the sequence are inserted one at a time, interspersed into the stream of data symbols, with the sequence repeating as necessary until all data symbols are transmitted. The same predefined randomly generated sequence of pilot symbols is used for all modems constructed in accordance with the present invention, so that at any modem 29, the demodulator can monitor the pilot symbols extracted from the received signal to synchronize the demodulation process and update equalizer coefficients used to equalize the received signal.

Figure 2A:
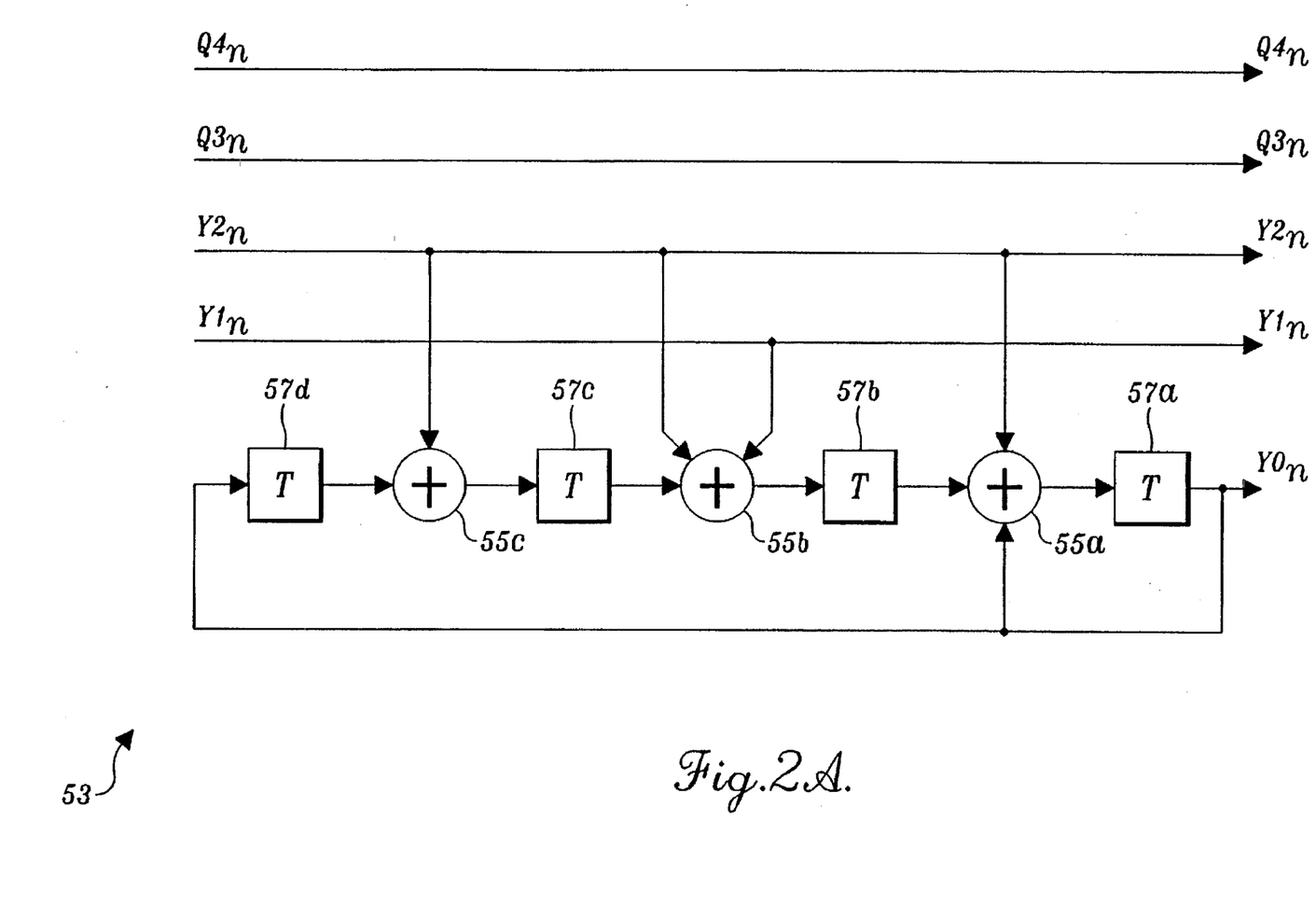
FIG. 2A is a convolutional encoder used to encode input data in the modulator.

As shown in FIG. 2A, the data symbol source that is used for conveying data (as opposed to Morse code) preferably comprises a convolutional encoder 53, which processes four bits of binary input data at a time. The four bits of binary input data are represented by $Y1_n$, $Y2_n$, $Q3_n$, and $Q4_n$, where the subscript "n" identifies the encoder clock time, beginning at a time n=0. Only two of the bits, $Y1_n$ and $Y2_n$, are used to encode $YO_n$ by encoder 53; bits $Y1_n$, $Y2_n$, $Q3_n$, and $Q4_n$ are passed through the encoder unchanged. Bits $Y1_n$ and $Y2_n$ are encoded by performing a series of XOR operations on the data, as indicated at three nodes 55a, 55b, and 55c. A series of time delays, T, are effected at blocks 57a, 57b, 57c, and 57d by providing buffered storage for data that are shifted out with each encoder clock pulse. Each time delay of block 57 preferably comprises a one-bit delay buffer. In this scheme, the previous value of $YO_n$ is XORed with the current value of $Y2_n$ and the resulting value is buffered in block 57c. At the same time, a new value is entered into block 57b that is the result of XORing the current values for $Y1_n$ and $Y2_n$ with the value previously buffered in block 57c. Similarly, a new value is entered into the buffer of block 57a that is the result of XORing the current value for $Y2_n$ with the value buffered in block 57b, and the current value of $YO_n$. Convolutional encoder 53 thus successively encodes bits $Y1_n$ and $Y2_n$ to produce a fifth bit $YO_n$ (for the clock time n=0, $YO_n$ is initialized to 0), which is redundant. The 16-state trellis encoding scheme has a constraint length equal to four, compared to the V.32 Standard, which uses an eight state scheme having a constraint length of three.

Figure 2B:
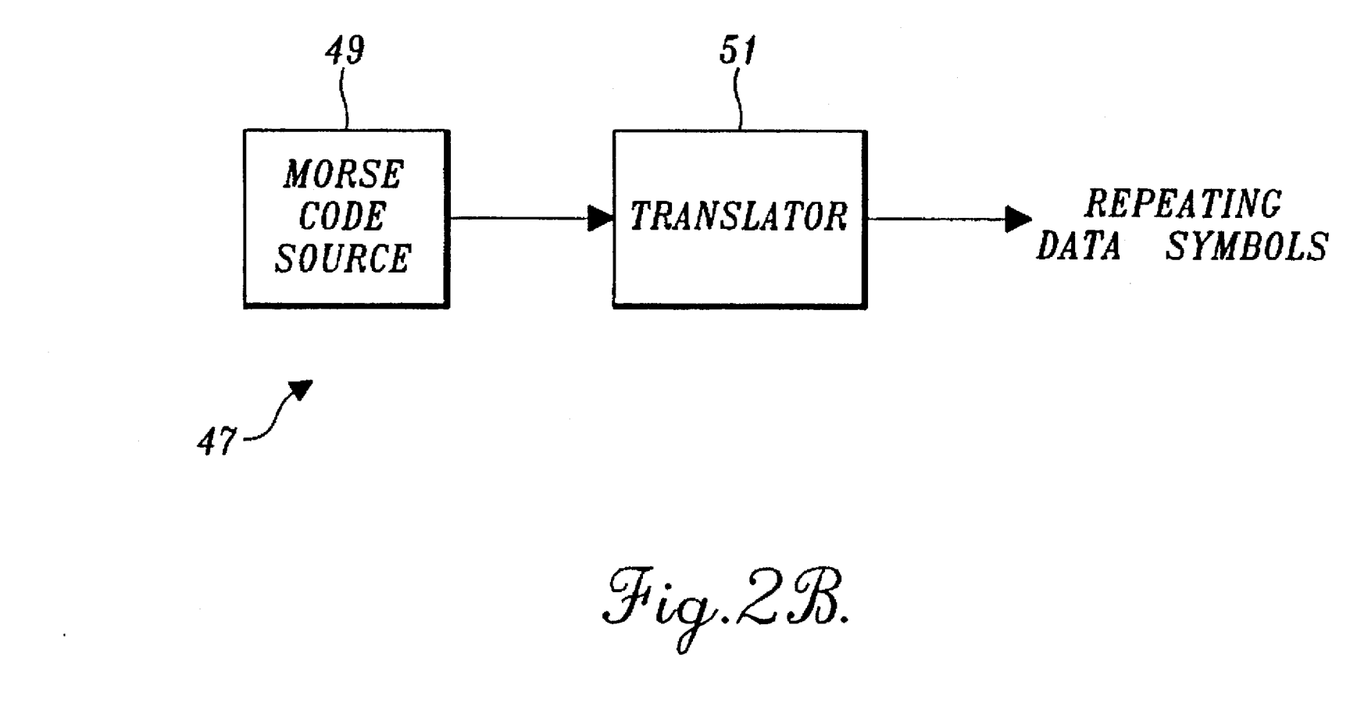
FIG. 2B is a block diagram of a station identifier that periodically produces data symbols representing the Morse code, which is used to identify a transmitting site.

When Morse code is to be transmitted instead of data symbols corresponding to actual data, data symbol source 52 is switched to a station identifier 47 (shown in FIG. 2B) that includes a source of Morse code 49, which specifies the actual dots and dashes to be transmitted, e.g., using a look-up table providing the Morse code dots and dashes required to identify the modulator site, and a translator 51 that produces a sequence A of predefined data symbols that corresponds to a dot of the Morse code, or a sequence B of predefined data symbols that corresponds to a dash of the Morse code. As is well known to those of ordinary skill in the art, frequency depends on rate of change of phase, i.e., phase rotation. There is a fixed incremental phase rotation between the successive predefined data symbols comprising sequence A, so that inclusion of sequence A in the transmitted signal, when heard as a received signal on a loudspeaker (not shown), is audible as a first frequency, e.g. 1200 Hz. Similarly, there is a fixed incremental phase rotation between successive data symbols comprising sequence B that is different than the relative phase rotation between successive data symbols in sequence A, selected so that when sequence B is included in the transmitted signal, it provides a received signal audible on the loudspeaker as a second frequency, e.g., as an 1800 Hz tone, which is different from the first frequency. The sequences A and B of data symbols, interspersed with pilot symbols (which are audible in the received signal only as low amplitude white noise), thus convey the specific Morse code provided by Morse code source 49 as a series of first and second frequency tones corresponding to dots and dashes.

With reference back to FIG. 2, a logic driven switch 54 selects between the data symbol source in block 52 and the pilot symbol source in block 56. A line 60 couples the pilot symbol source to logic driven switch 54. In the preferred embodiment, every 13th symbol selected by logic driven switch 54 for input to symbol mapping in block 62 is a pilot symbol. Each pilot symbol also comprises five bits. Data are encoded and mapped to symbols at a rate of 2400 symbols per second in this embodiment.

The five bits output from data symbol source in block 52 or the five bits from the pilot symbol source in block 56, depending upon the position of logic switch 54, are mapped into a 32-point signal constellation, producing a complex baseband signal conveyed on lines 64 and 66, as shown in FIG. 2. The I portion of the signal conveyed on line 64 is applied to a low-pass filter 68, which eliminates out-of-band components. Similarly, the Q signal conveyed on line 66 is input to a corresponding matched filter 70. The filtered signals output from these two filters are respectively applied to a multiplier 72 (from filter 68) and to a multiplier 74 (from filter 70). Multiplier 72 multiplies the filtered I portion of the signal by a function $cos(2\pi f_c t)$, as shown in a block 76. Similarly, the filtered Q portion of the signal input to multiplier 74 is multiplied by a quadrature function sin $(2\pi f_c t)$, as shown in a block 78. The resulting passband components at the output of multipliers 72 and 74 are then summed together in a summing junction 80, producing a passband signal s(t) that is conveyed over telephone line 28a or in the form of RF signal 33, as shown in FIG. 1, for receipt and demodulation by demodulator 30.

Figure 8:
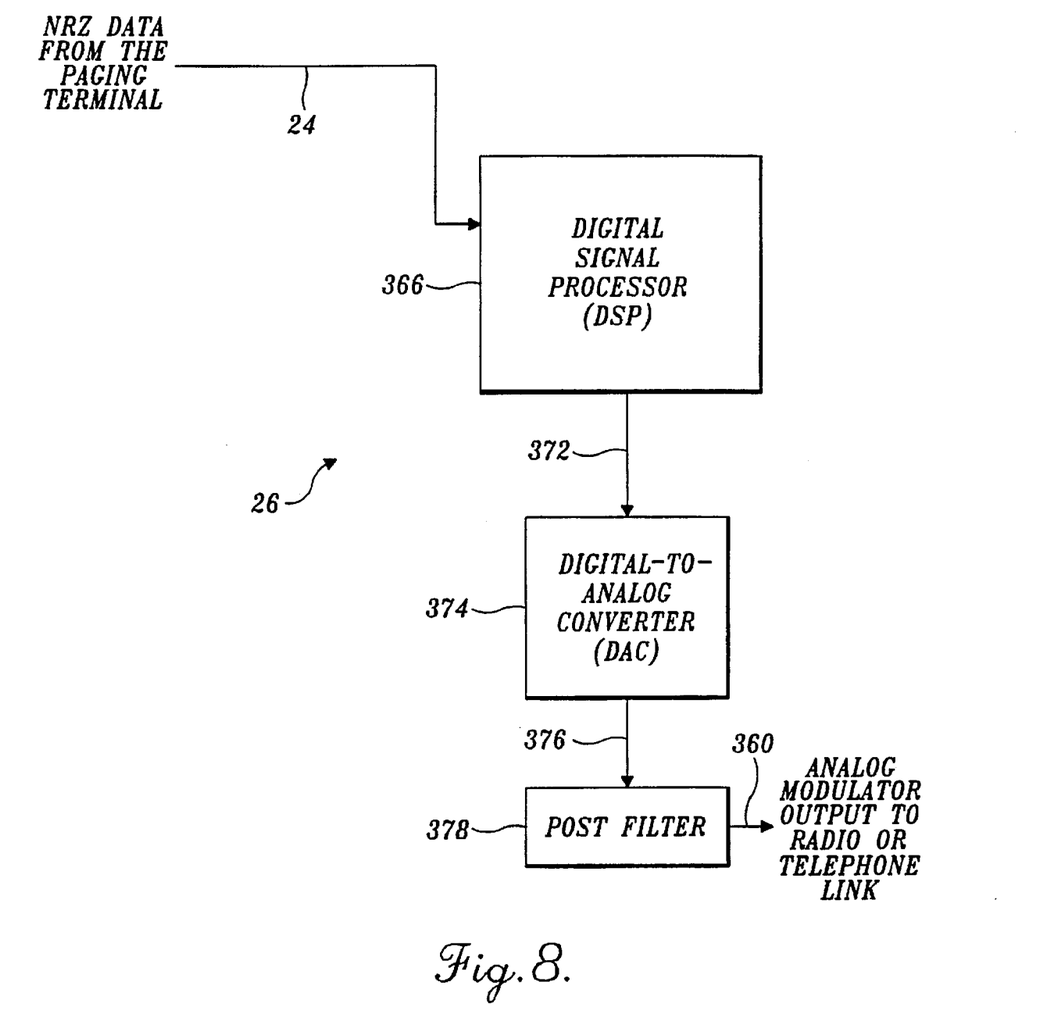
FIG. 8 is a schematic block diagram of the modulator portion of the high speed modem.

FIG. 8 illustrates the components used to implement the modulation functions as shown in FIG. 2. The NRZ signal from the paging terminal (or other source) is conveyed on line 24 to a digital signal processor (DSP) 366. Virtually all of the encoding and mapping functions discussed above are implemented by the DSP in accordance with a programmed set of instructions. The passband signal that is thus produced is conveyed on lines 372 to a digital-to-analog converter (DAC) 374, which produces a corresponding analog signal. The analog signal is applied over a line 376 to a post filter 378, and a filtered output signal is delivered from the post filter to the radio transmitter or to a telephone link (shown in FIG. 1), on a line 360, for transmission to the corresponding modem at the other end of the communication link, where the received signal will be demodulated by the present invention.

Figure 3:
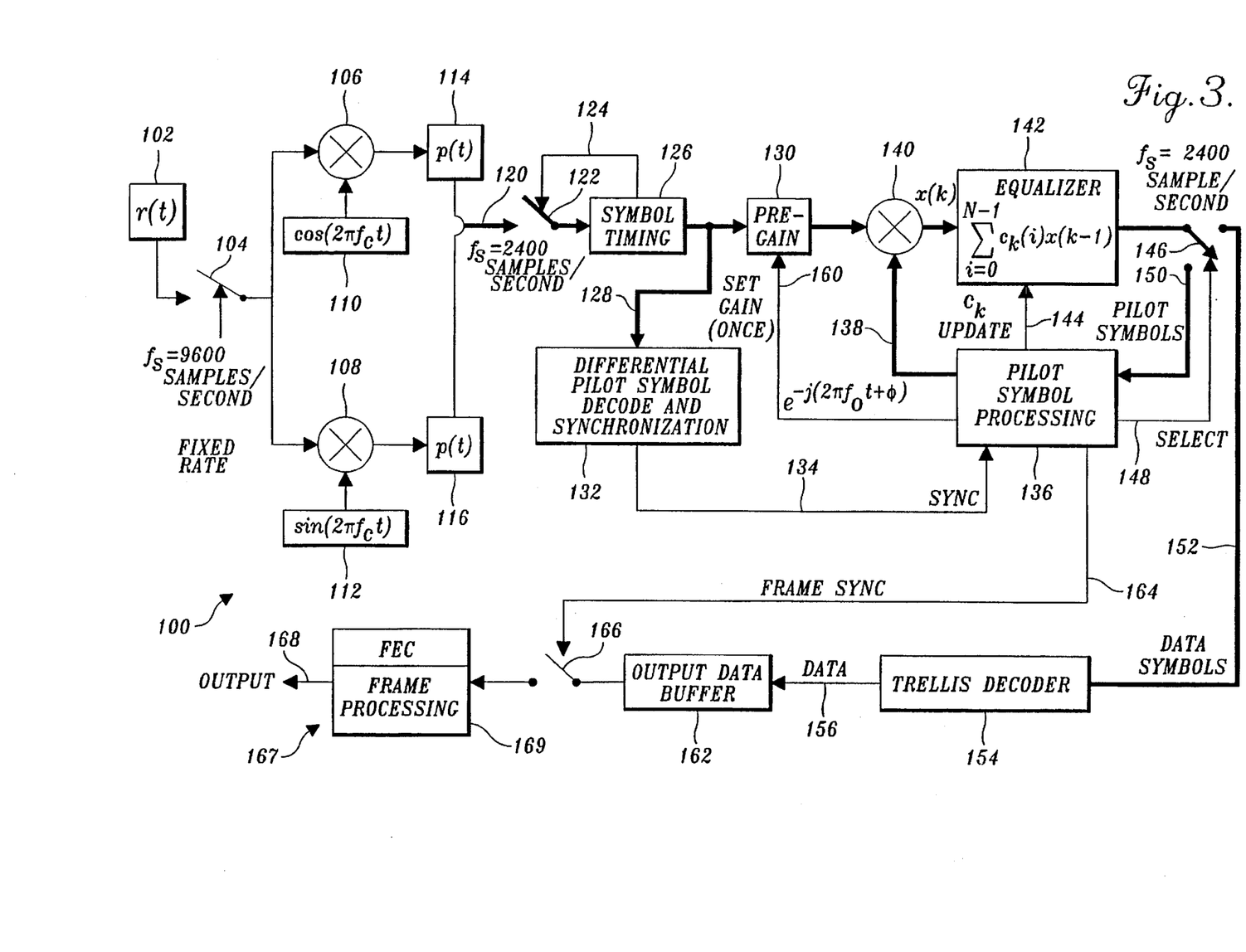
FIG. 3 is a functional block diagram of a demodulator in accordance with the present invention.

Referring to FIG. 3, a block diagram 100 illustrates the functional aspects of demodulator 30. A received signal, indicated by r(t) in a block 102, generally corresponds to the modulator output signal s(t) in block 82 of FIG. 2. However, due to line noise and/or other sources of signal degradation in the channel that can affect the signal during its propagation between modulator 26 and demodulator 30, the received signal r(t) may have been altered slightly so that it does not correspond exactly to the modulated output signal s(t). The present invention uses the pilot symbols that were included in the transmitted signal to recover the data transmitted, even though the received signal has been affected by its transmission to the demodulator. It is also contemplated that in certain applications, the received signal r(t) may be a digital signal instead of analog. For example, a pulse code modulated (PCM) signal could be input to the modulator.

The received signal r(t), whether analog or digital, is sampled at a fixed rate $f_s$ equal to 9600 samples/sec. If the received signal is analog, it is converted to digital by an analog-to-digital converter (ADC), which is not specifically shown. Instead, since either analog or digital signals can be processed by the demodulator and either type of signal is sampled at 9600 samples/sec., the input stage of the demodulator is generally represented in FIG. 3 as a switch 104. Sampling of the received analog signal is not synchronized with any reference clock, but simply occurs arbitrarily at the fixed rate. The digital samples (or sampled signal) produced by sampling the received signal are input to multipliers 106 and 108, which are connected in parallel, producing quadrature signals. In multiplier 106, the sampled signal is multiplied by a function $cos(2\pi f_c t)$ provided by a block 110, producing an output that is applied to a low-pass filter 114. In this filter, a function p(t) acts on the signal to provide anti-aliasing and to remove out-of-band noise. Similarly, multiplier 108 multiplies the digital samples of the received signal by a function $sin(2\pi f_c t)$ as indicated in a block 112. The product the multiplication is input to a low-pass filter 116, which provides a filter function p(t) matching that of low-pass filter 114, for anti-aliasing and for removal of out-of-band noise.

The outputs of low-pass filters 114 and 116 jointly comprise a complex baseband signal derived from the received signal. A switch 122 samples the complex baseband signal at a rate of 2400 samples/sec. The time at which these samples are taken by switch 122 is controlled by a timing signal output from a symbol timing block 126 on a line 124. This timing signal, which is determined as a function of the data and pilot symbols included in the received signal, controls the sampling of the complex baseband signal so as to synchronize with the occurrence of each data symbol.

Samples of the complex baseband signal are conveyed from symbol timing block 126 on a line 128 to a differential pilot symbol decode and synchronization block 132, which derives a synchronization signal that is output on a line 134. Differential pilot symbol decode and synchronization block 132 searches for the start (or end) of the 63 pilot symbols comprising the repeating pseudo-random pilot symbol sequence to determine the timing of the synchronization signal for each frame of data symbols. This synchronization signal is conveyed on line 134 into a pilot symbol processing block 136, which controls the majority of the demodulator synchronization functions. It should be noted that in the claims following this description, the term "symbol synchronization means" is intended to include the functions of symbol timing block 126, differential pilot symbol decode and synchronization block 132, and pilot symbol processing block 136.

The samples of the complex baseband signal are input on line 128 to a pre-gain block 130, which includes an automatic gain control. The automatic gain control ensures that the sampled signal has an amplitude within a desired range. Gain of the automatic gain control in pre-gain block 130 is set in response to a feedback signal that is input on a line 160 from pilot symbol processing block 136.

The amplified signal from block 130 is input to a multiplier 140, which multiplies the complex baseband signal by a function $e^{-j(2\pi f_O t + \phi)}$, where $f_O$ corresponds to a frequency offset correction determined by pilot symbol processing block 136, t is time, and $\phi$ corresponds to a phase tracking correction of the complex baseband signal. The frequency offset correction is used to correct for frequency offsets of up to 7 Hz in the complex baseband signal derived from the received signal. If the frequency offset correction were not applied, errors in the demodulation process would occur. Pilot symbol processing block 136 determines the frequency offset correction based upon the rate of phase rotation of the pilot symbols contained in the complex baseband signal.

Phase corrected samples of the complex baseband signal comprising a signal x(k) are input to an equalizer in a block 142, which equalizes the signal to correct for degradation that may have occurred during its transmission from the modulator. The equalizing function implemented in this block is as follows, where x(k)' is the equalized signal.

$$x(k)' = \sum_{i=0}^{N-1} c_k(i)x(k-1) \quad (1)$$

The coefficients $c_k$ in the above equation correspond to equalizer tap coefficients, which are continually updated by pilot symbol processing block 136 and supplied to the equalizer in block 142 on lines 144. These coefficients are determined as a function of the received pilot symbols, i.e., based on a comparison of the received pilot symbols with the expected pilot symbols in the pre-defined sequence that was randomly produced and made available to both the modulator and demodulator.

The equalized signal from block 142 is selectively applied either to a line 150 to select each pilot symbol in the signal or to a line 152 to select successive data symbols in the signal, using a logic switch 146, which is controlled by a select signal produced by pilot symbol processing block 136 and conveyed on a line 148. Since in the preferred embodiment, every 13th symbol in the equalized output is a pilot symbol, pilot symbol processing block 136 simply uses a timing function controlled by the synchronization signal, to determine when the signal output from the equalizer in block 142 is a pilot symbol or a data symbol and then switches the output signal accordingly. Successive symbols are output from block 142 at a rate of 2400 symbols/second.

Logic switch 146 couples to line 152 to pass 12 successive data symbols to a trellis decoder block 154, and then switches to line 150 to convey the 13th symbol, which is a pilot symbol, to pilot symbol processing block 136. The signal output from the equalizer in block 142 is switched between lines 150 and 152 in this manner until all data symbols in the received signal have been processed.

The data symbols input to trellis decoder block 154 are decoded using a Viterbi decoder, and the received pilot symbols are used to determine the equalizer tap coefficients $c_k$, to adjust the gain and phase of the complex baseband signal, and to correct the frequency offset, as described above. Because of the use of pilot symbols in this manner, data produced by trellis decoder 154 and input over a line 156 to an output data buffer block 162, are much less affected by channel noise and other sources of signal degradation than data transmitted between conventional modems. Pilot symbol processing block 136 determines frame synchronization by controlling a switch 166. When switch 166 is closed, a frame of output data that is stored in output data buffer 162 is supplied to an output block 167. Output block 167 provides for data frame processing using forward error correction (FEC), as indicated in a block 169. The FEC applied to the data frame employs a conventional cyclic redundancy check (CRC) algorithm and a Reed Solomon decoder to identify and correct errors in the data. The decoded and corrected data are finally output on a line 168.

If a temporary line outage (or interruption) occurs in the middle of a transmission between modulator 26 and demodulator 30, for example, due to a very long noise burst or a momentary line disconnect that causes the demodulator to lose synchronization, then the demodulator will immediately resynchronize when the channel returns to normal operation. This automatic resynchronization capability is not provided in the V.32 Standard (or equivalent telephone line modem schemes that do not use pilot symbols), because such schemes require the sending modulator to stop transmission of data and then to retransmit a synchronization sequence before data transmission can again resume. In comparison, a communication system in which demodulator 30 is used is much more reliable and can recover from significant line outages much more quickly.

Figure 9:
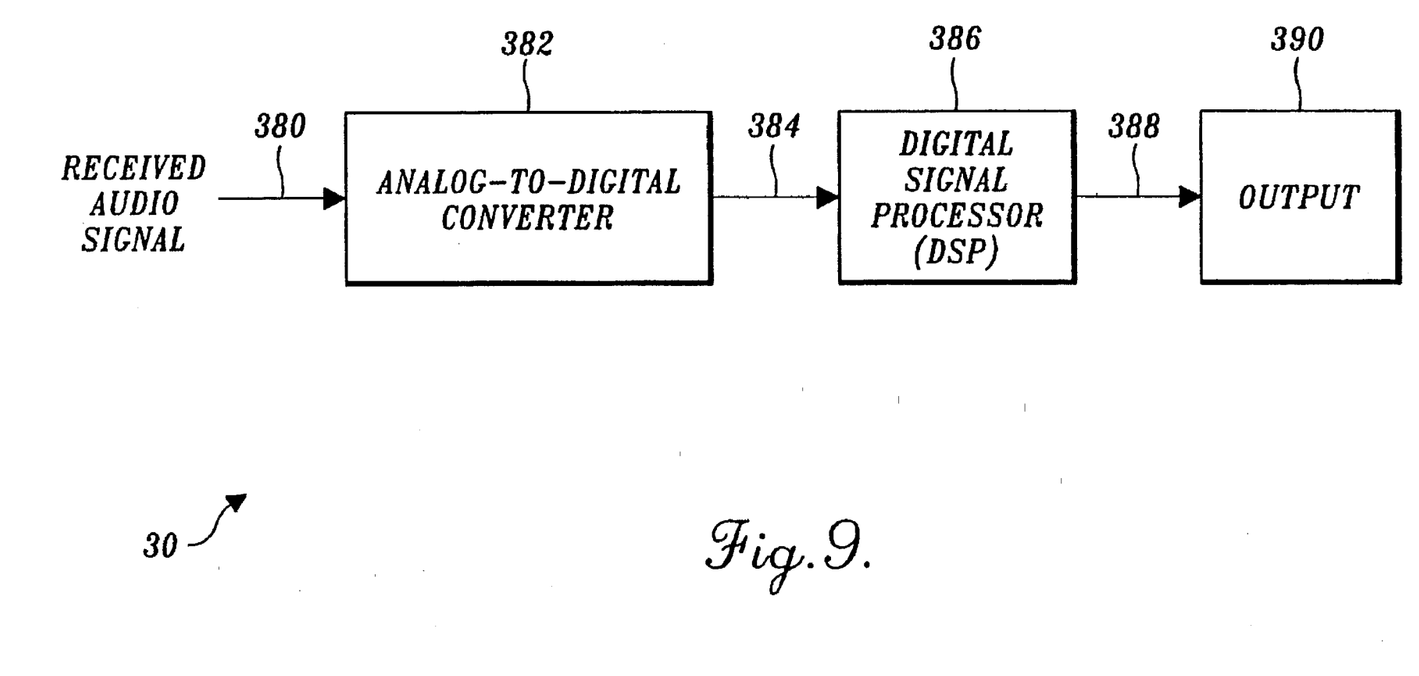
FIG. 9 is a schematic block diagram of the demodulator portion of the high speed modem.

A block diagram of demodulator 30 in FIG. 9 illustrates the relative simplicity of its hardware components, which include an analog-to-digital converter (ADC) 382 to convert (sample) the received analog or audio signal input on a line 380 into the digital signal at the 9600 Hz rate, for input on a line 384 into a DSP 386. ADC 382 corresponds to switch 104 in FIG. 3. As was the case in the modulator, most of the functions illustrated in FIG. 3 are implemented by DSP 382, in accordance with programmed instructions. Since both the modulation and demodulation of data are carried out by DSPs programmed to provide the desired functions, it is appropriate at this time to discuss the logic employed in each of the devices.

Figure 4:
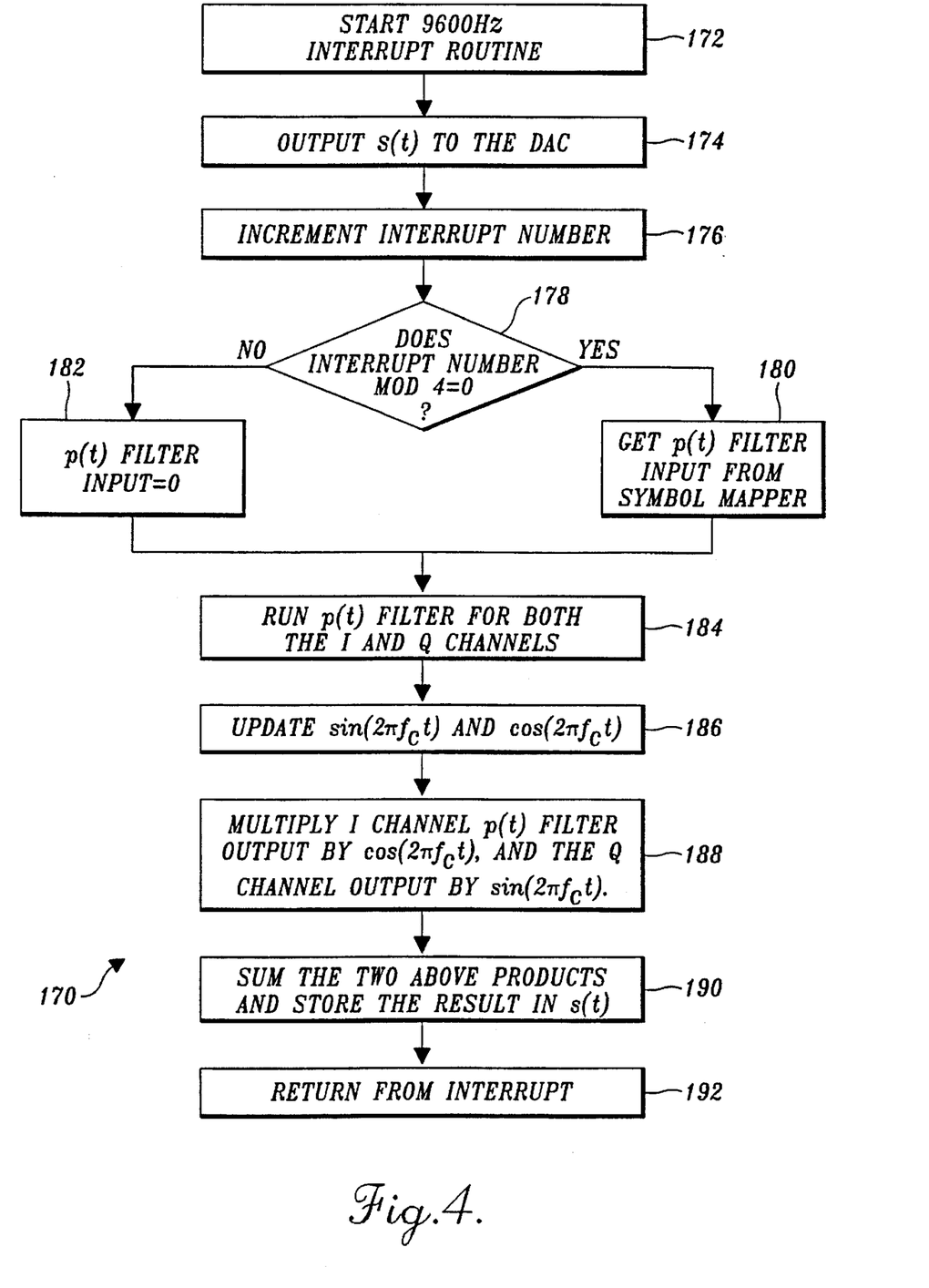
FIG. 4 is a flow chart of the logic employed by the modulator in an interrupt routine that encodes the input data as data symbols and converts the data symbols and pilot symbols into a passband signal for transmission to the demodulator.

Turning now to FIG. 4, a flow chart 170 illustrates the steps carried out by the modulator in encoding data for transmission to the demodulator. Beginning with a block 172, the routine starts by transferring output data that have been mapped to data symbols with the periodically interspersed pilot symbols to DAC 374 at a rate four times the symbol rate. Thus, 9600 times a second, an interrupt routine causes the modulated data to be input to the DAC, as illustrated in a block 174. At each clock cycle, an interrupt number is incremented, as shown in a block 176. Thereafter, a decision block 178 determines if(interrupt number MOD 4) equals zero, i.e., whether the interrupt number is an integer multiple of four, since the symbol rate (2400 symbols per second) is equal to ¼ the sample rate. In other words, the output signal is sampled four times for each symbol transmitted.

An affirmative response to decision block 178 leads to a block 180 in which an input is obtained for the p(t) filter function applied for both the I and Q channels using data output from the symbol mapper in block 62 (shown in FIG. 2). If four samples of the output signal have not yet been taken to complete the current symbol, a negative response to decision block 178 leads to a block 182, which indicates that the p(t) filter input is equal to zero.

From both blocks 180 and 182, the logic proceeds to a block 184, in which the p(t) filter function is applied to both the I and Q channels. Thereafter, in a block 186, the functions $\sin(2\pi f_c t)$ and $\cos(2\pi f_c t)$ are updated for the current time t. In a block 188, the I channel output of the filter is multiplied by the updated cosine function, and the Q channel output of the filter is multiplied by the updated sine function. The resulting two products are summed to provide the transmitted signal s(t), which is stored (in a buffer that is not shown), as provided in a block 190, for transmission at the start of the next interrupt. The sample interrupt routine is then terminated in a block 192.

Figure 5:
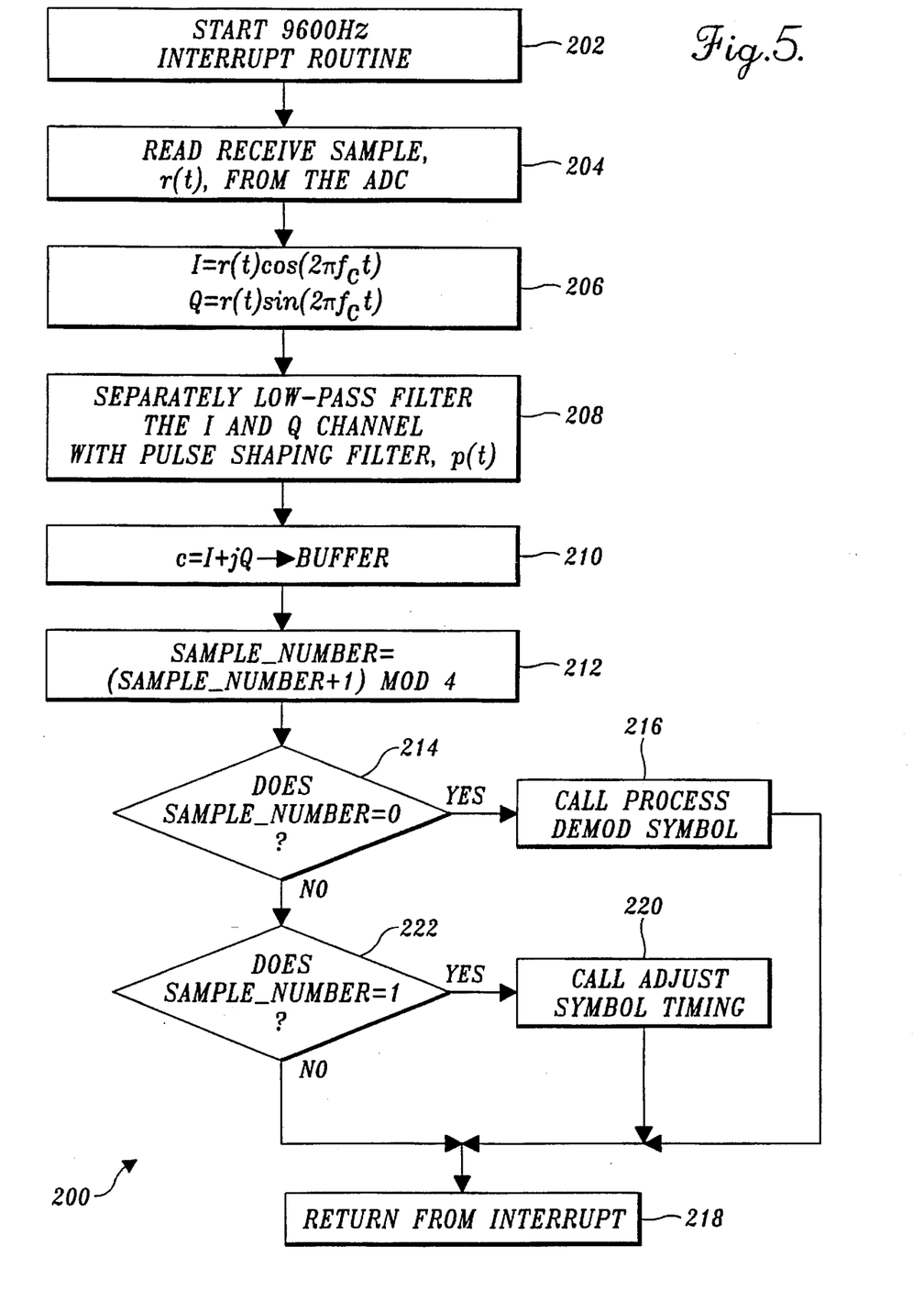
FIG. 5 is a flow chart showing the steps carried out by the demodulator to demodulate the data from the received signal.

In FIG. 5, the steps carried out by the demodulator are illustrated in a flow chart 200, beginning at a block 202, wherein the received signal r(t) is sampled 9600 times/ second. The resulting digital sample r(t) provided by the ADC is read in a block 204. In a block 206, values for I and Q, the complex baseband components are determined by respectively multiplying the samples of the received signal by cosine and sine functions of ($2\pi f_c t$). The two components of the complex baseband signal are then low-pass filtered, as shown in a block 208, using pulse shaping filter function p(t). The filtered I and Q components are stored in a buffer, as shown in a block 210.

In a block 212, a variable referred to as SAMPLE_NUMBER_is set equal to (SAMPLE_NUMBER+1) MOD 4. The purpose of this step is to ensure that at every fourth sample, a routine is called for processing the demodulated symbol. Thus, in a decision block 214, a determination is made as to whether SAMPLE_NUMBER is equal to zero and if so, in a block 216, a PROCESS DEMOD SYMBOL routine is called. Details of this subroutine are explained below in connection with FIG. 7.

Alternatively, if the new value of SAMPLE_NUMBER is not equal to zero, a decision block 222 determines if the value of SAMPLE_NUMBER is one and if so, calls an ADJUST SYMBOL TIMING routine in a block 220. Details of the ADJUST SYMBOL TIMING routine are discussed below with regard to FIG. 6. After returning from either the PROCESS DEMOD SYMBOL routine or the ADJUST SYMBOL TIMING routine, or if the result of decision block 222 is negative, the program logic proceeds to a block 218, which returns from the interrupt initiated in block 202.

Figure 7:
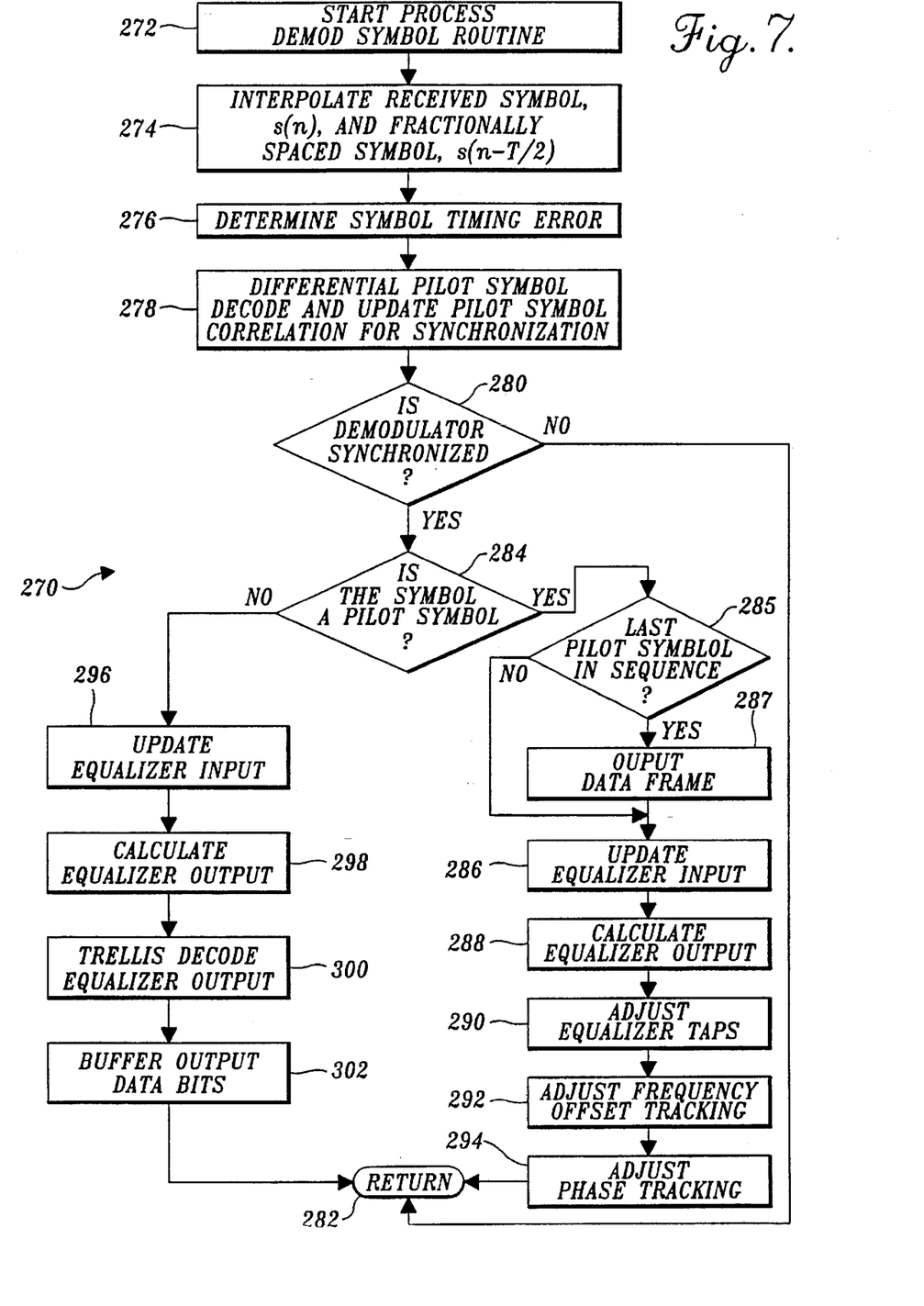
FIG. 7 is a flow chart of a routine for processing the demodulated symbols in the demodulator of the present invention.

A flow chart 270 illustrated in FIG. 7 discloses the steps implemented in carrying out the PROCESS DEMOD SYMBOL routine, which starts in a block 272. In the first step shown in a block 274, a received symbol s(n) is interpolated and a fractionally spaced symbol s(n−T/2) is determined. This step is required because the received signal r(t) is sampled at 9600 times/second, but symbols likely start at times intermediate the points in time at which the received signal is sampled (and are thus referred to as fractionally spaced symbols). In this interpolation process, the received symbol s(n) is interpolated between the current sample and the sample immediately preceding the current sample. The fractionally spaced symbol is therefore the symbol that was received two samples prior to the current sample.

In a block 276, a SYMBOL TIMING ERROR is determined, based upon the difference in time at which the current symbol was initially sampled and the beginning of that sample. Clearly, the SYMBOL TIMING ERROR is equal to zero only if switch 122 was closed concurrently with the beginning of the symbol instead of at some time before or after the beginning of the symbol. The difference in time between the beginning of the symbol and the time that the switch closed corresponds to the SYMBOL TIMING ERROR. This value is used in the ADJUST SYMBOL TIMING ROUTINE of FIG. 6.

A block 278 labeled DIFFERENTIAL PILOT SYMBOL DECODE AND UPDATE PILOT SYMBOL CORRELATION FOR SYNCHRONIZATION refers to the function of determining the phase difference between successive pilot symbols and as a function of the pilot symbols thus decoded, updating the synchronization signal (i.e., carrying out the previously described function of differential pilot symbol decode and synchronization block 132 in FIG. 3). The pilot symbol phase difference is expressed as either a binary 1 or 0, depending upon whether the phase difference is 180° or 0°, respectively. Since the pilot symbols transmitted are in a pre-defined pseudo-random sequence, a corresponding sequence of decoded pilot symbol phase differences (expressed as binary values) is expected in the complex baseband signal derived from the received signal. The correlation value that identifies the end of a sequence of the pilot symbols (and thus the start of the next sequence), which is used as a basis for determining the synchronization, is identified using a comb filter and is a function of the comparison of the differential pilot symbol phase values that are decoded and the expected differential pilot symbol phase values that correspond to the pre-defined sequence of pseudo-random pilot symbols.

In a decision block 280, a determination is made as to whether the demodulator is synchronized with the modulator. The demodulator is considered to be synchronized if the correlation value is greater than about 60% of its maximum value. However, if this value is less than 60% of its maximum value, the demodulator is consider unsynchronized, and the logic proceeds to a return block 282.

Once nominal synchronization is obtained (i.e., within the acceptable range), the logic proceeds to a decision block 284, which determines if the current symbol is a pilot symbol or a data symbol, based upon timing relative to the synchronization signal. As noted above, every 13th symbol is a pilot symbol and the intervening 12 symbols are data symbols. At a block 285, the logic determines if the current pilot symbol is the last pilot symbol of the pre-defined repeating sequence of pilot symbols, based on the correlation of the phase differences with the expected phase differences, and if so, proceeds to a block 287, which enables output of the buffered data frame that is stored by output data buffer 162 (shown in FIG. 3). At a block 286, the equalizer input signal is updated with the pilot symbol. Thereafter, a block 288 determines the equalizer output in accordance with the equation described above in connection with block 142 (in FIG. 3). In a block 290, the equalizer tap coefficients $c_k$ are adjusted by comparing the expected pilot symbol to the equalized received pilot symbol provided by the equalizer. In other words, if the pilot symbol output from the equalizer does not match the expected pilot symbol in the pre-defined sequence, the equalizer tap coefficients are adjusted to provide the expected pilot symbol.

Frequency offsets and phase errors in the received signal are compensated by adjusting the demodulator's frequency offset tracking and phase error in a block 292. This step corresponds to a determination of the value $f_o$ that provides the required frequency offset correction of the signal input on a line 138 to multiplier 140 in FIG. 3. Finally, in a block 294, phase tracking is adjusted in response to the phase error $\phi$, which is determined by the phase difference between the received and expected pilot symbol from block 136 (in FIG. 3). The logic then continues on the demodulator flow diagram illustrated in FIG. 5.

If a data symbol is currently being processed after synchronization is achieved between the demodulator and modulator, the flow of logic proceeds from decision block 284 to a block 296, in which the equalizer input is updated. Thereafter, the equalizer output is determined in a block 298 using the current equalizer tap coefficients in the summation of each of the samples defining the data symbol. The resulting equalized data symbol is then input to the trellis decoder, as indicated in a block 300 in flow chart 270, for trellis decoding of the data symbol, using a conventional Viterbi decoding algorithm. Since the encoder module configuration used for encoding the data transmitted is known, the shortest path through the trellis diagram from a current state (i.e., the encoded symbol) back to the original state of the data encoded has the highest probability associated with it. Accordingly, that path through the Trellis determines the data most likely transmitted. Thus, the data bits mentioned in a block 302 in flow chart 270 correspond with a high probability to the data originally transmitted. After the output data are stored in a buffer in block 302, the logic returns at block 282, as noted above.

Figure 6:
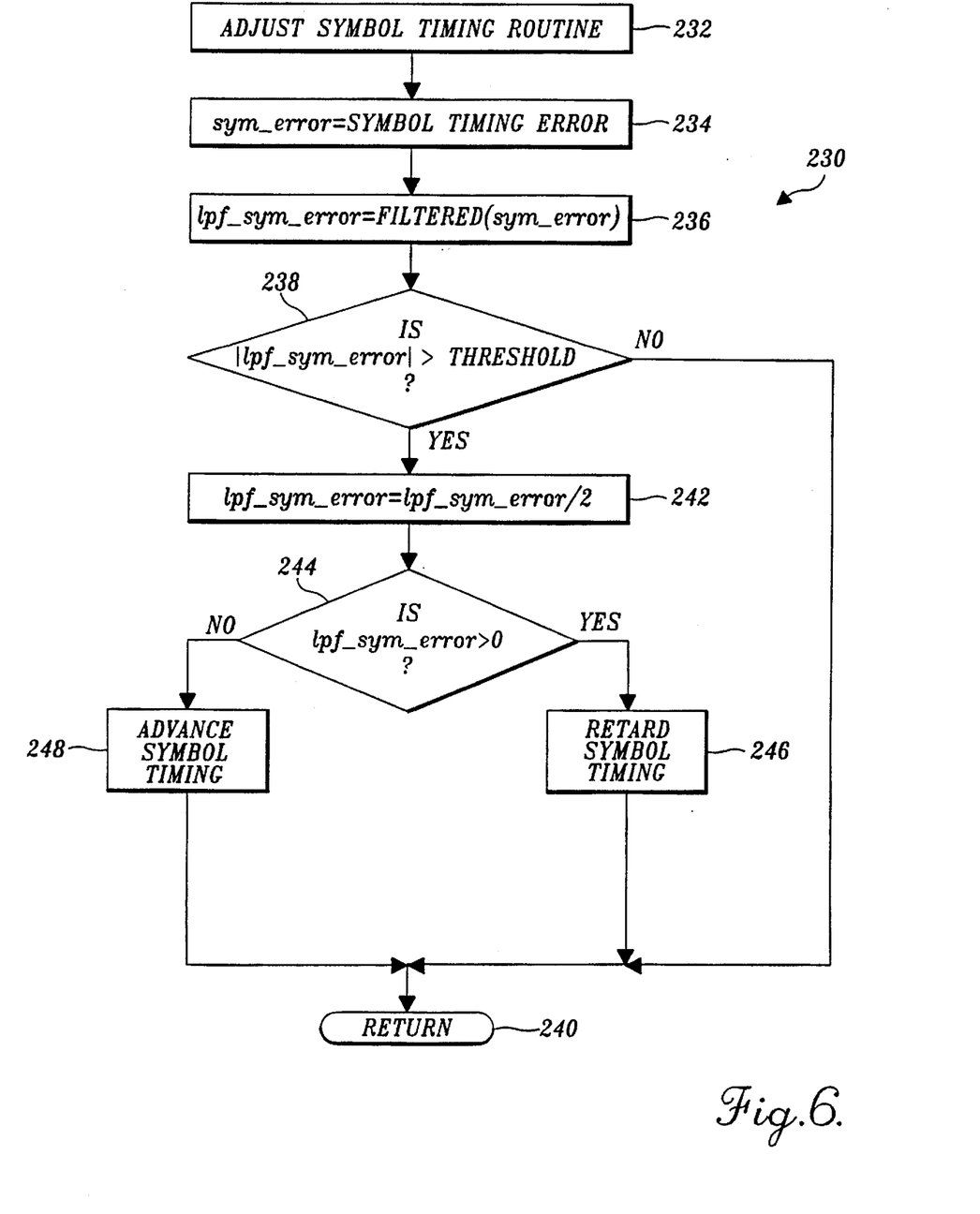
FIG. 6 is a flow chart of a routine for adjusting symbol timing in the demodulator.

The ADJUST SYMBOL TIMING routine that is called in block 220 (FIG. 5) is illustrated in a flow chart 230 in FIG. 6, starting at a block 232. The first step of this routine in a block 234 is to set a variable sym_error equal to the value of SYMBOL TIMING ERROR that was determined in block 276 in FIG. 7. Next, in a block 236, a variable lpf_sym_error, corresponding to the lowpass filter symbol error is set equal to the filtered sym_error, i.e., the value sym_error is low-pass filtered in symbol timing block 126 to obtain a running average of the sym_error variable.

A decision block 238 determines if an absolute value of the variable lpf_sym_error is greater than a threshold value. In the preferred embodiment, the threshold is proportional to an average of $|r(t)|^2$. If this condition is not met, the logic proceeds to a return block 240. Conversely, if the condition is met, the value lpf_sym_error is set equal to its previous value divided by two in a block 242; this step effectively resets the running average to a substantially lower value, so that the next time a determination is made in decision block 238, the logic will likely proceed to return block 240, because the average error is less than the threshold value. Next, a decision block 244 determines if the value of lpf_sym_error is greater than zero, i.e., if this value is positive and, if so, a block 246 retards the symbol time by delaying the sampling by switch 122 (shown in FIG. 3). Conversely, if the value of lpf_sym_error is negative, a block 248 advances the symbol timing by advancing the sampling by switch 122. Methods for delaying or advancing the sampling of a signal are well known to those of ordinary skill in this art and need not be further discussed.

Morse code can periodically be transmitted by the modulator site for identification purposes, using the two predefined sequences of data symbols that are selected specifically to represent the dots and dashes of the Morse code by virtue of their audible characteristics resulting from the phase rotation between successive data symbols in the sequences. However, the present invention maintains synchronization of the demodulator during such transmissions, and any data symbols representing data (not Morse code) that are transmitted after the transmission of Morse code ceases can be immediately demodulated, because the demodulator uses the pilot symbols that are transmitted with the data symbols representing the Morse code to stay in synchronization.

Although the disclosed preferred embodiment of the demodulator process a signal received as a passband signal by converting the passband signal to a complex baseband signal, it is also contemplated that many of the same benefits can be achieved by processing the passband signal directly, without such conversion. To directly process the received signal in the passband instead of the complex baseband, low-pass filters 114 and 116 must be changed to passband filters, and the equalizer shown in block 142 must be a passband equalizer instead of a complex baseband equalizer. These and other changes necessary to process the received signal in the passband so as to realize the benefits of the present invention discussed above in connection with the preferred embodiment will be apparent to one of ordinary skill in the art.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Apparatus for demodulating an input signal that includes data symbols used to encode data and pilot symbols, said pilot symbols being a predetermined pseudo-random sequence of digital signals that are interspersed one at a time with said data symbols, so that each repeated sequence of said predetermined pseudo-random sequence of pilot symbols defines one data frame of a data message that is collectively established by said data symbols, said demodulator comprising:

(a) signal sampling means for periodically sampling the input signal to provide a sequence of digital signal samples which includes signal samples that correspond to pilot symbols of said input signal and includes signal samples that correspond to data symbols of said input signal;

(b) a quadrature converter for processing said sequence of digital signal samples to produce a complex baseband signal that corresponds to said sequence of digital signal samples;

(c) synchronization means, said synchronization means including means for processing the complex baseband signal to determine a symbol timing error signal, said synchronization means further including means responsive to said symbol timing error signal for adjusting symbol sampling time to produce a synchronized signal in which signal samples corresponding to input data symbols and signal samples corresponding to pilot symbols are synchronized relative to the corresponding data symbols of said input signal and the corresponding pilot symbols of said input signal;

(d) signal synchronization means for processing said synchronized signal to separate said signal samples representative of pilot symbols from signal samples representative of data symbols;

(e) frame synchronization means for receiving the signal samples that correspond to said input pilot symbols and for comparing said data symbols that correspond to said pilot symbols with a sequence of digital signals that represent said predetermined pseudo-random sequence of said pilot symbols, said frame synchronization means detecting the end of one data frame and the beginning of a next data frame by determining processing by said frame synchronization means of the signal sample that corresponds to the last pilot symbol of said predetermined pseudo-random sequence of pilot symbols or the signal sample that corresponds to the first pilot symbol of said predetermined pseudo-random sequence of pilot symbols, said frame synchronization means supplying a signal to indicate detection of the end of one data frame and the start of a next data frame, said frame synchronization means processing said signal samples that correspond to said pilot symbols to determine an autocorrelation value and supplying said signal to indicate detection of the end of one data frame and the start of a next data frame when said autocorrelation value exceeds a predetermined threshold value.

(f) decoding means for processing said signal samples that correspond to said data symbols, said decoding means supplying a digital signal representative of said data message.

2. The apparatus of claim 1 wherein the data symbols of said input signal at times convey a Morse code message by selective use of first and second sequences of data symbols, and wherein said decoding means processes the signal samples that correspond to said first and second predetermined sequences of data symbols to supply a signal representative of a first audible output frequency in response to signal samples that correspond to said first sequence of data symbols, and a second output frequency in response to signal samples that correspond to said second sequence of data symbols.

3. The apparatus of claim 2, wherein said input signal to said apparatus is a signal, transmitted from a remote location via a transmission channel that causes signal degradation in said input signal and said apparatus further comprises:

(a) adaptive equalization means for receiving said synchronized signal supplied by said synchronization means, said adaptive equalizer means equalizing said synchronized signal in accordance with a set of applied equalizer tap coefficients to supply said synchronized signal to said signal synchronization means as an equalized synchronized signal; and (b) said synchronization means further includes means for providing updated sets of equalizer tap coefficients to said adaptive equalizer means, said means for supplying said updated sets of equalizer tap coefficients receiving said signal samples representative of pilot symbols from said signal synchronization means and processing said signal samples representative of pilot symbols to periodically supply said updated sets of equalizer tap coefficients.

4. The apparatus of claim 1, wherein said input signal to said apparatus is a signal transmitted from a remote location via a transmission channel that causes signal degradation in said input signal and said apparatus further comprises:

(a) adaptive equalization means for receiving said synchronized signal supplied by said synchronization means, said adaptive equalizer means equalizing said synchronized signal in accordance with a set of applied equalizer tap coefficients to supply said synchronized signal to said signal synchronization means as an equalized synchronized signal; and (b) said synchronization means further includes means for reproviding updated sets of equalizer tap coefficients to said adaptive equalizer means, said means for supplying said updated sets of equalizer tap coefficients receiving said signal samples representative of pilot symbols said signal synchronization means and processing said signal samples representative of pilot symbols to periodically said updated sets of equalizer tap coefficients.

5. The apparatus of claim 4 wherein the data symbols of said input signal at times convey a Morse code message by selective use of first and second sequences of data symbols, and wherein said decoding means processes the signal samples that correspond to said first and second predetermined sequences of data symbols to supply a signal representative of a first audible output frequency in response to signal samples that correspond to said first sequence of data symbols, and a second output frequency in response to signal samples that correspond to said second sequence of data symbols.

6. A method for demodulating an input signal that includes data symbols used to encode data and pilot symbols, said pilot symbols being a predetermined pseudo-random sequence of digital signals that are interspersed one at a time with said data symbols so that each repeated sequence of said predetermined pseudo-random sequence of pilot symbols defines one data frame of a data message that is collectively established by the sequence of said data symbols, said method comprising the steps of:

(a) sampling the input signal and converting it to a sequence of digital signal samples;

(b) processing said digital signal samples to provide a complex baseband signal that corresponds to said sequence of digital signal samples and, further, corresponds to said input signal;

(c) processing the complex baseband signal to determine a symbol timing error;

(d) in response to said symbol timing error, adjusting a symbol sampling time to produce a synchronized signal in which the signals representative of data symbols are synchronized with the corresponding data symbols of said input signal;

(e) processing said synchronized signal by:
 (i) separating said signals representative of the pilot symbols from said symbols representative of the data symbols;
 (ii) comparing said signals representative of said pilot symbols that have been separated from said signals representative of said data symbols with signals that correspond to said pseudo-random sequence of digital signals in said input signal to detect the final pilot symbol of a pseudo-random sequence of pilot symbols that is included in said input signal;
 (iii) generating a frame synchronization signal indicating that the final pilot symbol of a pseudo-random sequence of pilot symbols in said input signal has been detected;
 (iv) processing said frame synchronization signal to establish and maintain synchronization between the method for demodulating the input signal and the input signal on a frame-by-frame basis; and (f) decoding said signals representative of said data symbols to recover said data message that is collectively established by said data symbols of said input signal.

* * * * *